United States Patent
Van Rompay

(10) Patent No.: US 6,692,336 B2
(45) Date of Patent: Feb. 17, 2004

(54) METHOD FOR PROTECTING UNDERWATER SURFACES AGAINST POLLUTION DUE TO FOULING, AND BRUSH AND COATING AGENT USED THEREWITH

(76) Inventor: Boudewijn Gabriël Van Rompay, 307 Spottis Woode Ct., Clearwater, FL (US) 33756

( * ) Notice: Subject to any disclaimer, the term of this patent is extended or adjusted under 35 U.S.C. 154(b) by 0 days.

(21) Appl. No.: 10/149,416

(22) Filed: Jun. 21, 2002

(65) Prior Publication Data

US 2002/0182980 A1 Dec. 5, 2002

(30) Foreign Application Priority Data

Dec. 21, 1999 (BE) .............................................. 9900824

(51) Int. Cl.⁷ ................................................ B24B 1/00
(52) U.S. Cl. .............................. 451/28; 451/36; 451/66; 451/103; 451/104; 451/526; 427/383.1; 427/383.5; 427/385.5; 427/386

(58) Field of Search .............................. 451/28, 36, 66, 451/103, 104, 526; 427/383.1, 383.5, 385.5, 386

(56) References Cited

U.S. PATENT DOCUMENTS

| | | | | |
|---|---|---|---|---|
| 4,058,082 A | * | 11/1977 | Winn | 118/9 |
| 5,614,006 A | * | 3/1997 | Algar | 106/18.31 |
| 5,670,215 A | * | 9/1997 | Oakes | 427/385.5 |
| 5,915,436 A | * | 6/1999 | Johnson et al. | 15/187 |

* cited by examiner

*Primary Examiner*—Joseph J. Hail, III
*Assistant Examiner*—Shantese McDonald
(74) *Attorney, Agent, or Firm*—Bacon & Thomas, PLLC

(57) ABSTRACT

The invention relates to a method for protecting an underwater surface (3) against pollution due to fouling, in particular a metal surface, upon which a coating (4) is applied, whereby the coating (4), in the presence of water, is brushed or polished smooth with at least one brush (8) having brushes (9) made of synthetic material in which a grinding agent (10) is embedded. In the coating (4), glass flakes (5) are embedded to which silver is bonded.

11 Claims, 1 Drawing Sheet

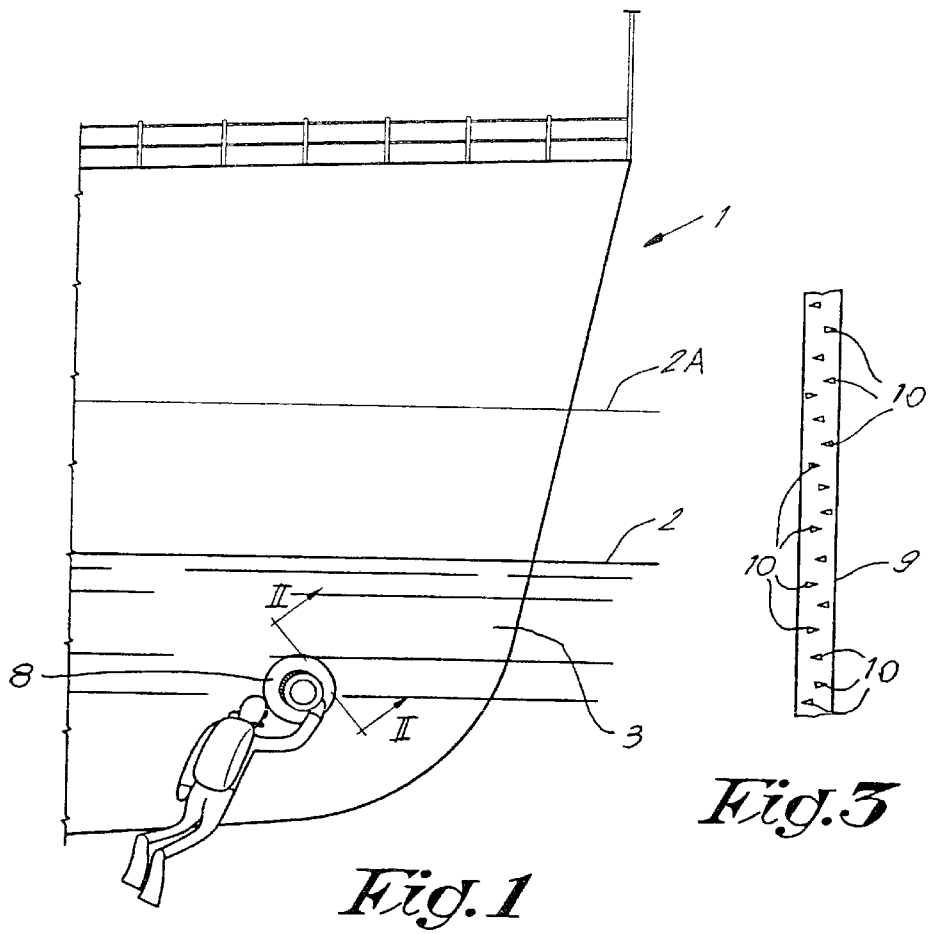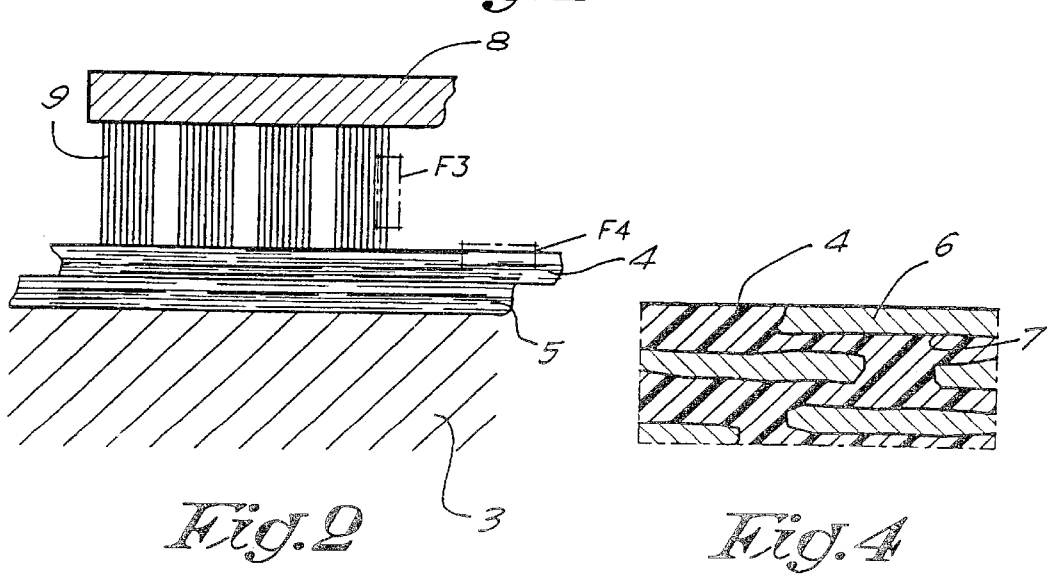
Fig.1  Fig.3  Fig.2  Fig.4

METHOD FOR PROTECTING UNDERWATER SURFACES AGAINST POLLUTION DUE TO FOULING, AND BRUSH AND COATING AGENT USED THEREWITH

This invention relates to a method for protecting underwater surfaces, in particular metal surfaces, against pollution due to fouling.

It is known that surfaces which generally or regularly are situated under water, in particular, parts of the hulls of ships and such, are rapidly polluted due to fouling by organisms present in the water, such as algae or other beings living in water, such as, for example, crustaceae.

Such pollution by biological growth on the hull of a ship below the water level increases the weight of the ship and increases the friction in the water, as a result of which the energy consumption for navigating is increased.

Cleaning these surfaces is time-consuming and expensive.

Therefore, attempts are made to prevent the pollution due to fouling, and to this aim a coating, a so-called anti-fouling coating, is applied to the surface.

This coating may consist of one or more layers of paint to which a chemical biocide has been added.

These biocides, however, gradually are released into the water and are very harmful for the water fauna and flora. In most cases, they are also aggressive in respect to the metal of the ship's hull.

Moreover, such layers of paint regularly have to be renewed, which has to be performed in a dry dock and is relatively expensive.

WO-A-94/19415 discloses such anti-fouling coating comprising copper oxide. Copper ions, which are toxic to aquatic and marine organisms, are released in the water Other known coatings consist of one or more layers of a synthetic material, for example, polyester, to which glass flakes are possibly added for reinforcement.

Although by the coating consisting of synthetic material the pollution is strongly reduced, this pollution, anyhow, still takes place rather fast.

The invention aims at a method for protecting underwater surfaces against pollution due to fouling which offers a better protection than the aforementioned known methods.

According to the invention, this aim is achieved in that an under-water surface upon which a coating wherein glass particles, so-called "glass flakes" are provided, has been applied, is protected by brushing or polishing smooth the coating, before or after fouling, in the presence of water, with at least one brush having bristles made of synthetic material into which a grinding agent is embedded.

This method utilizes the observation that, the smoother the surface, the slower the pollution due to fouling under water is taking place. By brushing or polishing, a very smooth surface can be obtained.

The brushing or polishing may take place under water or aground, however, in this last case during brushing or polishing, water has to be provided on the brushed surface.

U.S. Pat. No. 5,915,436 discloses a brush having bristles made out of polymer containing abrasive particles. No specific use is mentioned.

DE-A-2.016.575 discloses a device for removing fouling from underwater bodies, said device comprising rotating brushes. The brushes may be steel wire brushes, but in one embodiment these steel wire brushes are replaced by brush-like elements to which grinding means are bonded.

According to the invention, preferably, the brushing or polishing is performed by means of a brush with bristles in which aluminium oxide or silicium carbide particles are embedded.

The bristles of the brush can be manufactured of a supple synthetic material, such as nylon, polyethylene, polyester and similar.

An additional protection against pollution due to fouling then can be obtained by brushing or polishing a coating in which glass flakes-are provided to which a non-toxic agent against micro-organisms is bonded.

It was noted that the micro-pollution is strongly counteracted by means of the agent against micro-organisms.

The coating can be provided in at least two layers, whereby at least in the outermost layer these glass flakes, with a non-toxic agent against micro-organisms bonded thereto, are applied.

With the intention of better showing the characteristics of the invention, hereafter, as an example without any limitative character, several preferred forms of embodiments of a method for protecting underwater surfaces against pollution due to fouling, according to the invention, are described with reference to the accompanying drawings, wherein:

FIG. 1 represents a lateral view of a portion of the hull of a ship during the application of the method according to the invention;

FIG. 2, at a larger scale, represents a cross-section according to line II—II in FIG. 1;

FIGS. 3 and 4, at a still larger scale, represent the portions indicated by F3, F4, respectively, in FIG. 2.

In FIG. 1, a portion of the steel hull 1 of a ship is represented.

The entire hull 1 of the ship or in any case the portion thereof situated below the lowest floating line 2 which is permanently under water and therefore forms an underwater surface 3, and preferably the portion situated at least below the highest floating line 2A, is coated with a coating 4.

As represented in detail in FIG. 4, this coating 4 consists of synthetic material in which glass flakes 5 are embedded, to which silver or a similar non-toxic agent against micro-organisms decelerating the growth of these micro-organisms or killing these micro-organisms is bonded.

A suitable synthetic material is polyester or vinyl polyester.

The coating 4 or covering can be formed by applying a liquid settable coating agent consisting of a matrix 6 based on non-polymerized synthetic material which sets due to polymerisation and in which the glass flakes 5 are distributed.

The application may take place by means of a brush, a roll or a spraying gun.

This coating 4 can be applied in a single layer of, for example, 1 mm, but preferably is applied in two layers of approximately 0,5 mm, as represented in the drawings.

The glass flakes 5 have a maximum dimension of approximately 0,4 mm. Their thickness is such that throughout the thickness of the coating 4, approximately 150 layers of glass flakes 5 are present.

The glass flakes 5 provide for that the coating 4 is impermeable to water, whereas the synthetic matrix 6 itself is permeable.

A non-toxic agent against micro-organisms can be bonded to the glass flakes 5.

The glass flakes 5 may be impregnated with this agent against micro-organisms or, as represented in FIG. 4, be covered with a thin layer 7 of this agent.

The agent against micro-organisms preferably is a metal, and a particularly suitable agent in this respect is silver.

The coating 4, which is applied aground, for example, in a dry dock, is smoothened in a subsequent step by brushing or polishing under water, as represented in FIG. 2.

In a variant, this brushing or polishing takes place aground; however, during brushing or polishing water is provided at the surface which is brushed or polished. In this variant, the brushing or polishing can be performed in a dry dock, for example, immediately after the setting of the coating 4.

In both forms of embodiment, the brushing or polishing takes place by means of a brush 8, whereby the bristles 9 thereof, which are arranged in bundles, are made of supple synthetic material in which, however, a grinding agent 10 is embedded, such as represented in FIG. 3.

This brush 8 can be moved mechanically, for example, rotated by means of a motor.

Suitable synthetic materials for the bristles 9 are, amongst others, nylon, polyethylene and polyester Suitable grinding agents 10 are, amongst others, aluminium oxide, and carborundum or siliciumcarbide, particles of which are embedded in the synthetic material of the bristles 9.

The method described in the aforegoing protects the underwater surface 3 against biological fouling, which is strongly decelerated.

On one hand, the brushing or polishing with the brush 8 described in the aforegoing provides for an extremely smooth surface, as a result of which a mechanical protection against growth is obtained.

On the other hand, the agent against micro-organisms on the glass flakes 5 counteracts the micro-pollution in that spores and other micro-organisms will not settle on the underwater surface 3.

Especially, the combination is efficient, whereby then the brushing or polishing not only smoothens the underwater surface 3, but moreover provides for that glass flakes 5 and, therefore, agent against microorganisms, become exposed on the exterior surface of the underwater surface 3, such that this agent can render its full effect.

The invention is in no way limited to the forms of embodiment described heretofore and represented in the figures, on the contrary may such method, brush and coating agent be realized in different variants without leaving the scope of the invention.

What is claimed is:

1. Method for protecting an underwater surface against fouling, with a coating including glass flakes, said method comprising the step of:

brushing or polishing the coating before or after fouling, in the presence of water, with at least one brush having bristles of synthetic material with a grinding agent embedded therein.

2. Method according to claim 1, characterized in that the coating is based on a synthetic material.

3. Method according to claim 1, characterized in that the step of brushing or polishing the coating is performed under water.

4. Method according to claim 1, characterized in that the step of brushing or polishing the coating is performed aground, wherein water is applied on the brushed or polished surface during the step of brushing or polishing the coating.

5. Method according to claim 1, characterized in that the brushing or polishing is performed with a brush with bristles having aluminum oxide or silicon carbide particles embedded therein.

6. Method according to claim 4, characterized in that the brushing or polishing is performed with a brush, the bristles of which are manufactured of supple synthetic material selected from the group consisting of nylon, polyethylene and polyester.

7. Method according to claim 1, characterized in that the brushed or polished coating having the glass flakes is provided with a non-toxic agent impervious to microorganisms.

8. Method according to claim 7, characterized in that the coating is applied in at least two layers, wherein glass flakes are present in at least in an outermost layer, with a non-toxic agent impervious to micro-organisms.

9. Method according to claim 7, characterized in that a metal is used as a non-toxic agent impervious to micro-organisms which decelerates the growth of and/or kills micro-organisms.

10. Method according to claim 9, characterized in that silver is selected as a non-toxic agent impervious to micro-organisms and bonded to the glass flakes.

11. Method according to claim 1, wherein the glass flakes are water impermeable.

* * * * *